United States Patent
Roach et al.

(10) Patent No.: US 10,508,060 B1
(45) Date of Patent: *Dec. 17, 2019

(54) FERTILIZER WITH ORGANIC POTASSIUM SALTS

(71) Applicant: Nachurs Alpine Solutions, Corp., Marion, OH (US)

(72) Inventors: Tommy Roach, Lubbock, TX (US); Gregory Bame, Marion, OH (US)

(73) Assignee: NACHURS ALPINE SOLUTIONS, CORP., Marion, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 16/503,566

(22) Filed: Jul. 4, 2019

Related U.S. Application Data

(63) Continuation-in-part of application No. 15/753,116, filed as application No. PCT/US2016/050121 on Sep.
(Continued)

(51) Int. Cl.
| | |
|---|---|
| *C05D 1/00* | (2006.01) |
| *C05D 1/02* | (2006.01) |
| *C05G 3/00* | (2006.01) |
| *C05B 11/10* | (2006.01) |
| *C05B 17/00* | (2006.01) |
| *C05C 9/00* | (2006.01) |
| *C05B 7/00* | (2006.01) |

(Continued)

(52) U.S. Cl.
CPC ............ *C05D 1/00* (2013.01); *C05B 7/00* (2013.01); *C05B 11/10* (2013.01); *C05B 17/00* (2013.01); *C05C 1/00* (2013.01); *C05C 3/00* (2013.01); *C05C 9/00* (2013.01); *C05C 11/00* (2013.01); *C05D 1/02* (2013.01); *C05F 1/002* (2013.01); *C05F 11/00* (2013.01); *C05G 3/00* (2013.01)

(58) Field of Classification Search
CPC .................... C05C 11/00; C05D 1/00
See application file for complete search history.

(56) References Cited

U.S. PATENT DOCUMENTS 8,002,870 B2 * 8/2011 Yamashita ............... C05D 9/02
405/128.5
9,474,215 B1 10/2016 Miller
(Continued)

FOREIGN PATENT DOCUMENTS

AU 2014101391 A4 1/2015

*Primary Examiner* — Wayne A Langel
(74) *Attorney, Agent, or Firm* — Law Office of J. L. Simunic; J. L. Simunic

(57) ABSTRACT

The present invention provides a new fertilizer comprising water and an organic potassium source wherein the fertilizer composition has a pH range of from 5.5 to 10.0 and a salt index no greater than about 40 as measured by electrical conductivity methods. The organic potassium source is selected from the group consisting of potassium acetate, potassium formate, potassium citrate, potassium succinate, potassium propionate, and combinations thereof. The fertilizer demonstrates lower phytotoxicity damage compared to other sources of potassium for fertilizer products. The fertilizer composition may further comprise nitrogen, phosphorus, sulfur, zinc, boron, calcium, manganese, iron, copper, cobalt, magnesium, molybdenum, inoculants, or a combination thereof.

15 Claims, 1 Drawing Sheet

Related U.S. Application Data

2, 2016, application No. 16/503,566, filed on Feb. 15, 2018, which is a continuation-in-part of application No. 15/753,123.

(60) Provisional application No. 62/213,742, filed on Sep. 3, 2015.

(51) Int. Cl.
*C05C 11/00* (2006.01)
*C05F 11/00* (2006.01)
*C05C 1/00* (2006.01)
*C05F 1/00* (2006.01)
*C05C 3/00* (2006.01)

(56) References Cited

U.S. PATENT DOCUMENTS

| | | |
|---|---|---|
| 9,771,306 B2 | 9/2017 | Roach |
| 2004/0035162 A1 | 2/2004 | Williams |
| 2005/0197252 A1 | 9/2005 | Yamashita |
| 2007/0051149 A1 | 3/2007 | Funk |
| 2008/0257000 A1 | 10/2008 | McMahon |
| 2014/0274719 A1 | 9/2014 | Davison |
| 2015/0239788 A1 | 8/2015 | Yamashita |
| 2016/0185673 A1 | 6/2016 | Miller |
| 2016/0304407 A1 | 10/2016 | Bame |
| 2017/0156337 A1 | 6/2017 | Scannell |

\* cited by examiner

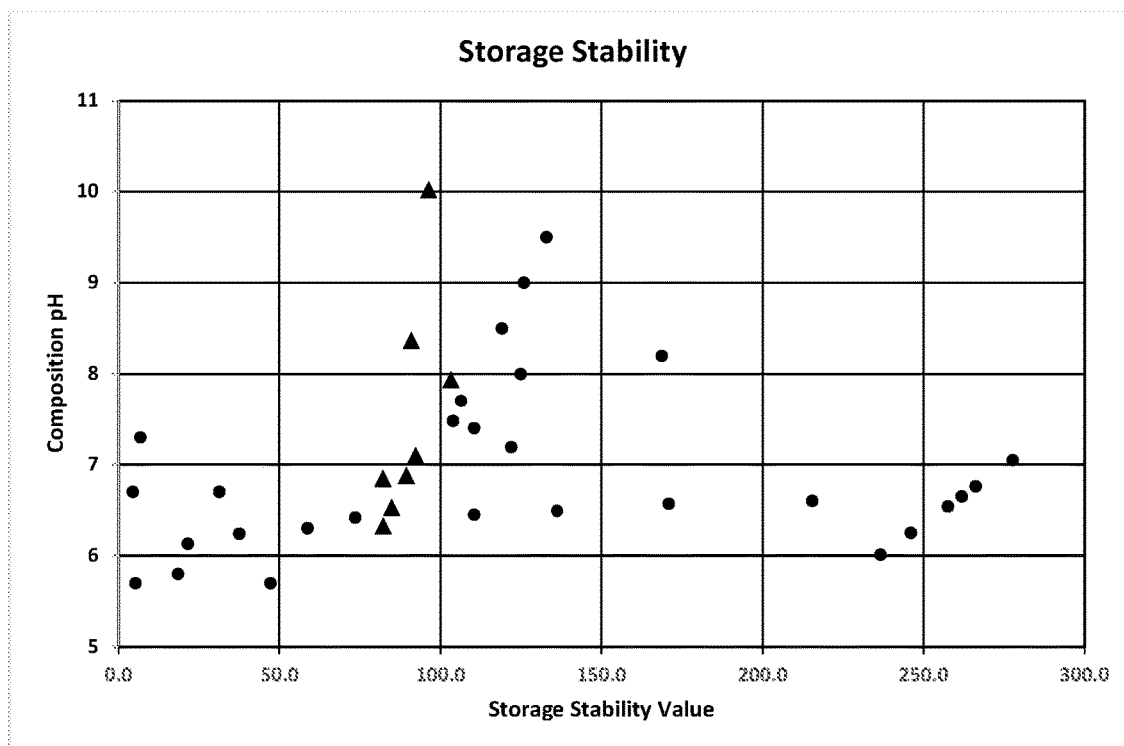

FERTILIZER WITH ORGANIC POTASSIUM SALTS

CROSS-REFERENCE TO PRIOR APPLICATIONS

The present application claims priority to U.S. Patent Application 62/213,742 filed 2015-Sep.-3, and to U.S. Patent Application 62/215,541 filed 2015-Sep.-8, and to PCT Application PCT/US16/50121 filed 2016-Sep.-2, and to PCT Application PCT/US16/50802 filed 2016-Sep.-2, and to U.S. patent application Ser. No. 15/753,116 filed 2018-Feb.-15, and to U.S. patent application Ser. No. 15/753,123 filed 2018-Feb.-15, which are incorporated by reference in their entireties.

FIELD OF THE INVENTION

The present invention relates to storage-stable aqueous plant fertilizer product having a pH of from about 6.0 to about 8.0 and a salt index no greater than about 40 as measured by electrical conductivity methods. The fertilizer composition of the present invention is environmentally-friendly and can be applied via known irrigation methods.

BACKGROUND OF THE INVENTION

In order to maintain healthy growth, plants must extract a variety of nutrients from the soil in which they grow. However, many soils are deficient in the necessary nutrients or the soils contain them only in forms which cannot be readily taken up by plants. To counteract these deficiencies, commercial fertilizing products containing select nutrients are commonly applied to soils in order to improve growth rates and yields obtained from crop plants.

Fertilizers come in two basic forms, liquid and dry. Liquid fertilizers have gained commercial approval mainly due to the ease of handling and application. Commercially viable liquid fertilizer products have a relatively high nutrient analysis. However, liquid fertilizers tend to have very short shelf-lives or lack storage stability.

Fertilizers may also be characterized by how they are utilized in agriculture. A "starter fertilizer" is typically used to promote the growth of newly planted crops, particularly newly germinated seeds. Starter fertilizers may be applied in bands or in-furrow. Banding fertilizer mixes the fertilizer with small portions of soil rather than placing the fertilizer in direct contact with the seed. However, banding can be expensive, can result in inconsistent soil fertility, and may create soil disturbance that can adversely affect seed placement. Alternatively, in-furrow treatment places the fertilizer directly with the seed during planting. This eliminates the negative effects seen with banding but can be stressful to the seed because the seeds can be sensitive to fertilizer salts.

The presence of fertilizer salts near a germinating seed or seedling root can cause injury to the plant. The salt creates a relatively high osmotic pressure in the soil surrounding the seed. This makes it more difficult for the seed to extract water from the soil and may cause water to be drawn out of the seed thereby desiccating the seed and eventually leading to plant death. Crop tolerances vary widely to increased osmotic potential from fertilizer near the seed. Wheat is moderately tolerant of high-salt conditions while soybeans are very sensitive. Most woody fruit and nut crops tend to be salt-sensitive, and it is generally advised that seed-placed fertilizers not be used because of potential decreased germination. However, this limits the ability of the seed to obtain necessary nutrients.

The most common components of fertilizer compositions, nitrogen, phosphorus and potassium, are usually provided in the form of salts to produce the fertilizer product. Potassium is normally required by a growing plant to stimulate early growth, to increase protein production, and to activate beneficial enzyme and hormone systems within the plant. These systems impact the plant's ability to withstand biotic and abiotic stress, and extreme cold and hot temperatures, and improves the plant's resistance to diseases and insects. Further, potassium increases water use efficiency and transforms sugars to starch. But, the typical potassium sources for fertilizers are inorganic potassium salts, such as potassium chloride (potash), potassium magnesium sulfate, potassium nitrate, and potassium sulfate. The inorganic anions found in these salts can have damaging effects on a germinating seed and on the environment.

The measure of the salt concentration that a fertilizer induces in the soil near the growing plant is known as the salt index. The salt index may be expressed in terms of the increase in osmotic pressure of the salt solution produced by a specific material relative to the osmotic pressure of the same weight of sodium nitrate ($NaNO_3$). However, determining the salt index according to this approach is time consuming and expensive. More commonly, the salt index is expressed in terms of the electrical conductivity of the salt solution of a specific material compared to the electrical conductivity of a salt solution of the same weight of sodium nitrate ($NaNO_3$). As used herein, "salt index" will refer to the electrical conductivity method of measurement.

Thus, it would be beneficial to have a storage-stable aqueous plant fertilizer product with a low salt index that is environmentally-friendly, that can be used near germinating seeds or seedling roots, and that can be applied via known irrigation methods.

SUMMARY OF THE PRESENT INVENTION

A storage-stable aqueous fertilizer composition comprising an organic potassium source, wherein the fertilizer has a neutral to slightly alkaline pH and a low salt content is described. More specifically, the aqueous fertilizer composition of present invention demonstrates storage stability at room temperature for at least twelve (12) months, has a pH of from about 6.0 to about 8.0, and has a salt index not greater than about 40 as measured by electrical conductivity methods. Optionally, the composition may include soluble nitrogen, soluble phosphate, additional potassium sources, sulfur, zinc, boron, calcium, manganese, iron, copper, cobalt, magnesium, molybdenum, acetic acid, inoculants, or a combination thereof.

In a preferred embodiment, the potassium source or potassium nutrient component is derived from potassium phosphate, carboxylic acid salts of potassium, potassium silicate and combinations thereof. Because of the lower salt index and the absence of inorganic anions delivered with the potassium, the fertilizer composition of the present invention demonstrates lower phytotoxicity damage compared to other sources of potassium for fertilizer products.

The fertilizer composition of the present invention is intended to be used in all cropping rotations and management practices where it can be placed in-furrow at planting, injected into the soil, surface dribbled in a band, sprayed between crop rows, or broadcast, foliar or fertigation applied to meet the crops' potassium requirements. The fertilizer is intended to be used on any potassium-requiring crops, such as but not limited to, corn, soybeans, wheat, alfalfa, sugar beets, potatoes, grapes, onions, peppers, lettuce, beans, celery, cauliflower, broccoli, pumpkins, nectarines, tomatoes, other fruits and vegetables, and pulse crops.

SUMMARY OF THE FIGURES

FIG. 1 is a graph showing the Storage Stability Value vs. the composition pH for the fertilizer compositions summarized in Table 1, wherein the compositions that are storage stable for at least three months at 70° F. are designated by a black circle and the compositions that are not storage stable are designated by a black triangle.

DETAILED DESCRIPTION OF THE PRESENT DEVELOPMENT

The present development is a composition for an aqueous, low salt concentration, commercial fertilizer product. The fertilizer of the present development has a neutral to slightly alkaline pH and a relatively low salt index, that is a salt index not greater than about 40 as measured by electrical conductivity methods, compared to other sources of potassium for fertilizer products. It is expected that the fertilizer can be applied in hard water regions by irrigation methods, including but not limited to subsurface drip, drip tape, micro-jet, center pivot, surface drip, flood, and sprinkler.

The fertilizer of the present invention comprises water and an organic potassium source. Optionally, the fertilizer may further comprise soluble nitrogen, a phosphate source, an acetic acid, a potash source, a microbial inoculant, secondary nutrient additives, or a combination thereof. Preferably, the secondary nutrient additives are selected from the group consisting of sulfur, zinc, boron, calcium, manganese, iron, copper, cobalt, magnesium, molybdenum or a combination thereof.

The fertilizer composition of the present application may be used in any environment but is particularly suitable for application in areas known for having hard water. For the purposes of this application, "water hardness" is defined as the amount of dissolved calcium and magnesium in the water, and "hard water" is defined as water having a water hardness equal to or greater than 120 ppm or water having a calcium ion concentration $[Ca^{2+}]$ plus magnesium ion concentration $[Mg^{2+}]$ equal to or greater than 120 ppm.

The organic potassium source may be any potassium salt with a carbon-based counterion that is water soluble, and preferably that is essentially non-reactive with common hard water components—that is, when the potassium source is exposed to hard water it must not react to form insoluble particulates or precipitates. Further, a relevant consideration when selecting the potassium source(s) is the potential impact on the salt level of the finished fertilizer composition. Because of its commercial availability and relatively low cost, potassium hydroxide is a common potassium source. However, potassium hydroxide has a greater impact on the salt index of a composition than organic salts of potassium ($KO_2R$). Expressing the relative relationship of potassium derived from potassium hydroxide and potassium derived from organic salts of potassium ($KO_2R$) as the ratio [$K_2O$ derived from KOH]/[$K_2O$ derived from $KO_2R$], the lower the ratio the lower the salt contributed by the potassium source. In a preferred embodiment, the ratio is less than about 3.5. It is intended that any particular value of the ratio [$K_2O$ derived from KOH]/[$K_2O$ derived from $KO_2R$] range between 0.0 and 3.5 is covered in this paper, whether expressly set forth as a preferred embodiment or not, and whether expressly included as an exemplary embodiment or not.

Representative organic potassium sources include carboxylic acid salts of potassium, and combinations thereof. The carboxylic acid salts of potassium anticipated by this invention include (1) HCOOK, or (2) $CH_3(CH_2)_x$COOK wherein x=0-4, or (3) MOOC$(CR^1R^2)_x$COOK wherein $R^1$=—H or —OH or —COOM and $R^2$=—H or —OH or —COOM and x=0-4 and M=H or K, or (4) HO$(CR^1R^2)_x$COOK wherein $R^1$=H or a C1 to C4 alkyl group and $R^2$=H or a C1 to C4 alkyl group and x=1-5, or (5) $CH_3CO(CR^1R^2)_x$COOK wherein $R^1$=H or a C1 to C4 alkyl group and $R^2$=H or a C1 to C4 alkyl group and x=1-3. Exemplary carboxylic acid salts of potassium as defined herein include potassium formate, potassium acetate, potassium propionate, potassium butyrate, potassium valerate, potassium hexanoate, potassium oxalate, potassium malonate, potassium succinate, potassium glutarate, potassium adipate, potassium lactate, potassium malate, potassium citrate, potassium glycolate, potassium tartrate, potassium glyoxylate, and potassium pyruvate. In a preferred embodiment, the potassium source is selected from potassium acetate, potassium formate, potassium citrate, potassium succinate, potassium propionate, and combinations thereof. In a more preferred embodiment, potassium acetate is used.

Optionally, inorganic potassium salts may be blended with the organic potassium sources, provided the inorganic potassium source selected and the concentration added provides that the final fertilizer composition has a pH between 5.5 and 9.0 and a salt index not greater than about 40 as measured by electrical conductivity methods. Representative inorganic potassium sources include potassium hydroxide, potassium phosphate, potassium silicate and combinations thereof.

The fertilizer composition must have a resulting available potassium concentration in the final composition of from about 1 wt % to about 40 wt % as expressed as $K_2O$, and preferably from about 3 wt % to about 30 wt %, and more preferably from about 3 wt % to about 25 wt %. Further, it is recommended that the potassium source or potassium source combination selected and the amount added to the composition should provide a buffering function to the composition and maintain the pH between 5.5 and 10.0, and preferably between 6.0 to 8.0, and more preferably between 6.4 to 7.6, and most preferably between 6.8 to 7.6. The preferred pH ranges are provided as examples only. It is intended that any particular pH range between 5.5 and 10.0 is covered in this paper, whether expressly set forth as a preferred embodiment or not, and whether expressly included as an exemplary embodiment or not.

As noted in paragraph [0017], a relevant consideration when selecting the potassium source(s) is the potential impact on the salt level of the finished fertilizer composition. It is known that potassium hydroxide has a greater impact on the salt index of a composition than organic salts of potassium ($KO_2R$). We have now found a correlation between the available potassium concentration in the final composition as expressed as $K_2O$, the relative relationship of potassium derived from potassium hydroxide and potassium derived from organic salts of potassium ($KO_2R$), the available phosphate concentration in the final composition as expressed as $P_5O_2$ and the fertilizer composition pH that is reflective of the shelf-live or storage stability of the fertilizer composition. Specifically, a Storage Stability Value can be calculated using Equation 1:

$$\frac{(|\% K \text{ in composition} - \% P \text{ in composition}|) \times (\text{pH value})}{([K_2O \text{ derived from KOH}]/[K_2O \text{ derived from } KO_2R])} = \text{Storage Stability Value} \quad \text{Eq. 1}$$

When the fertilizer composition has a Storage Stability Value less than about 75 and a pH between 5.5 and 7.7, the composition is storage stable for at least three months at about 70° F. When the fertilizer composition has a Storage Stability Value greater than about 100 and a pH between 6.0 and 9.5, the composition is storage stable for at least three months at about 70° F. When the Storage Stability Value is between 75-100, the fertilizer composition has been found to be unstable—cloudy and/or forms crystals—often within minutes. Table 1 provides some examples of compositions that are stable and some that are unstable. FIG. 1 presents the data from Table 1 graphically.

TABLE 1

| Example | % K in composition | [K$_2$O derived from KOH] / [K$_2$O derived from KO$_2$R] | % P in composition | pH | Stability Value |
|---|---|---|---|---|---|
| A-1 | 3 | 3.00 | 1 | 6.7 | 4.5 |
| B-1 | 6 | 2.17 | 4 | 5.7 | 5.3 |
| C-1 | 13 | 3.25 | 10 | 7.3 | 6.7 |
| D-1 | 11 | 0.94 | 8 | 5.8 | 18.5 |
| E-1 | 4 | 4.00 | 18 | 6.13 | 21.5 |
| F-1 | 4 | 3.00 | 18 | 6.7 | 31.3 |
| G-1 | 4 | 2.33 | 18 | 6.24 | 37.4 |
| H-1 | 6 | 2.17 | 24 | 5.7 | 47.3 |
| I-1 | 4 | 1.50 | 18 | 6.3 | 58.8 |
| J-1 | 4 | 1.22 | 18 | 6.42 | 73.6 |
| K-1 unstable | 5 | 1.00 | 17 | 6.85 | 82.2 |
| L-1 unstable | 5 | 1.00 | 18 | 6.33 | 82.3 |
| M-1 unstable | 5 | 1.00 | 18 | 6.53 | 84.9 |
| N-1 unstable | 5 | 1.00 | 18 | 6.88 | 89.4 |
| O-1 unstable | 16 | 0.92 | 6 | 8.37 | 91.0 |
| P-1 unstable | 5 | 1.00 | 18 | 7.1 | 92.3 |
| Q-1 unstable | 16 | 1.04 | 6 | 10.02 | 96.3 |
| R-1 unstable | 5 | 1.00 | 18 | 7.94 | 103.2 |
| S-1 | 16 | 0.72 | 6 | 7.48 | 103.9 |
| T-1 | 16 | 0.72 | 6 | 7.7 | 106.4 |
| U-1 | 4 | 0.82 | 18 | 6.45 | 110.4 |
| V-1 | 16 | 0.67 | 6 | 7.4 | 110.4 |
| W-1 | 4 | 1.00 | 18 | 8.5 | 119.0 |
| X-1 | 16 | 0.59 | 6 | 7.19 | 121.9 |
| Y-1 | 15 | 0.96 | 0 | 8.0 | 124.9 |
| Z-1 | 20 | 1.43 | 0 | 9.0 | 125.9 |
| AA-1 | 20 | 1.43 | 0 | 9.5 | 132.9 |
| BB-1 | 4 | 0.67 | 18 | 6.49 | 136.2 |
| CC-1 | 19 | 0.92 | 0 | 8.2 | 168.8 |
| DD-1 | 4 | 0.54 | 18 | 6.57 | 171.0 |
| EE-1 | 4 | 0.43 | 18 | 6.6 | 215.4 |
| FF-1 | 5 | 0.33 | 18 | 6.01 | 236.8 |
| GG-1 | 5 | 0.33 | 18 | 6.25 | 246.2 |
| HH-1 | 5 | 0.33 | 18 | 6.54 | 257.6 |
| II-1 | 5 | 0.33 | 18 | 6.65 | 262.0 |
| JJ-1 | 5 | 0.33 | 18 | 6.76 | 266.3 |
| KK-1 | 5 | 0.33 | 18 | 7.05 | 277.7 |
| LL-1 | 4 | 0.00 | 0 | 6.3 | — |
| MM-1 | 24 | 0.00 | 0 | 10.0 | — |

For demonstration purposes only, and not to be limiting with respect to claims, as shown in Table 2, a fertilizer composition made according to the present invention with a ratio of [K$_2$O derived from KOH]/[K$_2$O derived from KO$_2$R] that is less than 3.5, a Storage Stability Value greater than about 100 and a pH between 7.0 and 7.5, can have a shelf life in excess of one year at 70° F., and in some cases the composition can have a shelf life in excess of one year at more extreme conditions.

TABLE 2

| | Example | | | | |
|---|---|---|---|---|---|
| | Q-1 | O-1 | S-1 | V-1 | X-1 |
| pH | 10.02 | 8.37 | 7.48 | 7.40 | 7.19 |
| % K in composition | 16 | 16 | 16 | 16 | 16 |
| specific gravity | 1.244 | 1.244 | 1.244 | 1.244 | 1.244 |
| [K$_2$O derived from KOH] / [K$_2$O derived from KO$_2$R] | 1.04 | 0.92 | 0.72 | 0.67 | 0.59 |
| Storage Stability Value | 96.3 | 91.0 | 103.9 | 110.0 | 121.9 |
| 5° F. | unstable within minutes | stable for 1 month | stable for 18 months (study stopped) | stable for 3+ months | stable for 1 month |
| 20° F. | unstable within minutes | stable for 1 month | stable for 18 months (study stopped) | stable for 3+ months | stable for 1 months |
| 40° F. | unstable within minutes | stable for 1 month | stable for 18 months (study stopped) | stable for 15 months (study stopped) | stable for 15 months (study stopped) |
| 70° F. | unstable within minutes | unstable within minutes | stable for 18 months (study stopped) | stable for 15 months (study stopped) | stable for 15 months (study stopped) |
| 110° F. | unstable within minutes | unstable within minutes | stable for 18 months (study stopped) | stable for 3+ months (study stopped) | stable for 15 months (study stopped) |

The nitrogen source may be any soluble nitrogen source known in the art for fertilizer use, such as urea, nitrate, triazone urea, urea triazone solution, ammonia, ammonium salts, ammonium hydroxide, amino acids, fish meal or extract, compost extract, kelp extract, shrimp extract, shellfish extract, and combinations thereof. In a preferred embodiment, the soluble nitrogen source is essentially non-reactive with common hard water components—that is, when the nitrogen source is exposed to hard water it does not react to form insoluble particulates or precipitates. The concentration of the soluble nitrogen source will vary depending on the source selected, but the resulting available nitrogen in the final composition should be up to about 20%. In a preferred embodiment the available nitrogen is from 0.0% to about 20%, in a more preferred embodiment the available nitrogen is from 0.5% to about 15%, and in a most preferred embodiment is from about 1.5% to about 12.0%. In an exemplary embodiment, the soluble nitrogen source is urea and the urea comprises about 12.0 wt % of the composition.

The phosphorus is delivered in the form of phosphate and the available phosphate is expressed as $P_2O_5$ in the final composition. For the present fertilizer composition, the phosphorous or phosphate source is selected from the group consisting of rock phosphate, sodium phosphate, potassium phosphate, phosphoric acid, bone meal, monopotassium phosphate, dipotassium phosphate, tetrapotassium pyrophosphate, ammonium phosphate, calcium phosphate, potassium phosphate generated by reaction of potassium hydroxide with phosphoric acid, and combinations thereof. Preferably, the phosphate source further includes at least one source of orthophosphate. In a preferred embodiment, the phosphate source is phosphoric acid. In a more preferred embodiment, the phosphate source is a phosphoric acid solution having a pH<6.0. In a most preferred embodiment, the phosphate source is a 60% to 85% phosphoric acid solution. The phosphate source may vary, thereby affecting the amount needed in the composition, but the resulting available phosphate is expressed as $P_2O_5$ in the final composition should be from about 0% to about 25%. If an orthophosphate is used, the orthophosphate content should be no less than 50% of the total $P_2O_5$. Because of their reactivity, it is recommended that polyphosphates, and particularly those made from super phosphoric acid, not be used or be minimized in any composition of the present development.

Further, the fertilizer may optionally comprise a secondary nutrient at a concentration of from 0.0 wt % to about 25.0 wt %, and more preferably from about 0.2 wt % to about 10.0 wt %, wherein the secondary nutrient is derived from a sulfur source, a zinc source, a boron source, a calcium source, a manganese source, an iron source, a copper source, a cobalt source, a magnesium source, a molybdenum source or a combination thereof. Sources of secondary nutrients are well known in the art. Some representative examples, without limitation, include potassium thiosulfate, ammonium thiosulfate, zinc ethylenediaminetetraacetic acid (ZnEDTA), calcium ethylene-diaminetetraacetic acid (CaEDTA), ammonium calcium nitrate, manganese ethylenediaminetetraacetic acid (MnEDTA), iron ethylenediaminetetraacetic acid (FeEDTA), iron N-(hydroxyethyl) ethylene-diaminetriacetic acid (FeHEDTA), iron ethylenediamine-N, $N^1$-bis (2-hydroxyphenylacetic acid) (FeEDDHA), iron ethylene-diamine-di (2-hydroxy-5-sulfophenylacetic acid) (FeEDDHSA), cobalt ethylenediaminetetraacetic acid (CoEDTA), cobalt sulfate, magnesium ethylenediaminetetraacetic acid (MgEDTA), ethylene-diaminetetraacetic acid (CuEDTA), sodium borate, disodium octaborate tetrahydrate, boric acid, ammonium molybdate, sodium molybdate and combinations thereof. Other additives, such as a poly-aspartic acid or amino polycarboxylic acid or a combination thereof, may also be included in the composition.

Optionally, the fertilizer may further comprise acetic acid or a microbial inoculant or a combination thereof. The acetic acid is preferably a glacial acetic acid. The inoculant may comprise any of a number of viable organisms or beneficial microbes known in the art. Without limiting the scope of the claims, the inoculants may include those strains designated as *Bacillus subtilis, Bacillus methylotrophicus, Bacillus amyloliquefasciens, Bacillus megaterium* and *Bacillus licheniformis*, and combinations thereof. Preferably the strains selected for the composition comprise *Bacillus subtilis* PB 038, *Bacillus subtilis* PB 346, *Bacillus methylotrophicus* PB 105, *Bacillus methylotrophicus* PB 302, *Bacillus amyloliquefasciens* PB 178, *Bacillus amyloliquefasciens* PB 390, *Bacillus megaterium* PB 208 and *Bacillus licheniformis* PB 035, wherein each *Bacillus subtilis, Bacillus methylotrophicus, Bacillus amyloliquefasciens*, and *Bacillus megaterium* strain is added to deliver from about $3 \times 10^6$ cfu/mL to about $7 \times 10^6$ cfu/mL, and the *Bacillus licheniformis* is added to deliver from about $3 \times 10^4$ cfu/mL to about $7 \times 10^4$ cfu/mL. Optionally, other beneficial organisms, as desired to deliver microbial protective benefits to the crop, may be included in the composition.

Water is added to balance the composition. The final fertilizer composition may be in true solution, slurry, film, and/or liquid suspension form.

The exemplary embodiments presented in Table 3, not intended to be limiting with respect to scope of the development, are prepared by slowly adding to water the other composition ingredients, and then mixing at ambient temperature for at least 60 minutes ensuring that the temperature is held below 50° C. The solution is then filtered through a 10 micron filter before packaging. If inoculants are included in the composition, order of addition, residence times, and mixing temperatures may need to be adjusted to ensure viability of the inoculant. Samples A-U represent exemplary embodiments of the present invention, and Samples PrArtA-PrArtD represent embodiments of prior art formulations.

TABLE 3

| Sample | Nitrogen Source | Available N (wt %) | Phosphate Source | Available P (wt %) | Potassium Source | Available K (wt %) | Secondary Nutrient | Secondary Nutrient (wt %) | Salt Index |
|---|---|---|---|---|---|---|---|---|---|
| A-2 | urea + NH$_4$OH + (NH$_4$)$_2$S$_2$O$_3$ | 9.0 | phosphoric acid | 15.0 | K-acetate + KOH | 3.0 | (NH$_4$)$_2$S$_2$O$_3$ ZnEDTA | 1.0 0.25 | 36 |
| B-2 | urea + urea-triazone | 21.0 | phosphoric acid | 1.0 | K-acetate + KOH | 3.0 | — | 0 | 36 |
| C-2 | urea | 7.5 | ortho-phosphate | 10.0 | K-formate | 3.0 | CaEDTA CuEDTA | 1.4 6.8 | 42 |

TABLE 3-continued

| Sample | Nitrogen Source | Available N (wt %) | Phosphate Source | Available P (wt %) | Potassium Source | Available K (wt %) | Secondary Nutrient | Secondary Nutrient (wt %) | Salt Index |
|---|---|---|---|---|---|---|---|---|---|
| D-2 | urea | 8.0 | ortho-phosphate | 15.0 | K-formate | 3.0 | CaEDTA<br>CuEDTA | 1.4<br>6.8 | 36 |
| E-2 | urea + NH$_4$OH | 7.0 | phosphoric acid | 20.0 | K-acetate + KOH | 4.0 | — | 0 | 38 |
| F-2 | urea + NH$_4$OH | 10.0 | phosphoric acid | 18.0 | K-acetate + KOH | 4.0 | — | 0 | 19 |
| G-2 | urea + NH$_4$OH | 7.0 | ortho-phosphate | 19.8 | K-acetate + K$_2$S$_2$O$_3$ | 4.2 | K$_2$S$_2$O$_3$<br>ZnEDTA | 2.7<br>0.8 | 39 |
| H-2 | urea + NH$_4$OH | 5.0 | ortho-phosphate | 12.3 | K-acetate + K$_2$S$_2$O$_3$ | 5.0 | K$_2$S$_2$O$_3$<br>ZnEDTA | 2.7<br>0.8 | |
| I-2 | urea + ammonium polyphosphate | 8.0 | phosphoric acid | 4.0 | K-acetate + KOH | 6.0 | BNa$_3$O$_3$<br>CuEDTA<br>MnEDTA<br>ZnEDTA | 0.1<br>0.2<br>1.0<br>1.0 | 40 |
| J-2 | urea | 5.9 | ortho-phosphate | 24.0 | K-lactate | 6.3 | MnEDTA | 5.4 | 38 |
| K-2 | urea | 10.0 | phosphoric acid | 10.0 | K-malate + K$_2$S$_2$O$_3$ | 10.0 | K$_2$S$_2$O$_3$ | 8.5 | |
| L-2 | ammonium polyphosphate | 2.0 | phosphoric acid | 8.0 | K-acetate + K$_2$S$_2$O$_3$ + KCl | 11.0 | K$_2$S$_2$O$_3$ | 1.0 | 42 |
| M-2 | urea + NH$_4$OH + (NH$_4$)$_2$S$_2$O$_3$ | 3.0 | phosphoric acid | 10.0 | K-acetate + KOH | 13.0 | (NH$_4$)$_2$S$_2$O$_3$<br>ZnEDTA | 1.0<br>0.1 | 31 |
| N-2 | NH$_4$OH | 3.2 | orthophosphate | 10.0 | K-acetate + K$_2$S$_2$O$_3$ | 13.4 | K$_2$S$_2$O$_3$<br>FeHEDTA | 0.2<br>2.6 | 31 |
| O-2 | — | 0 | — | 0 | K-succinate | 15.0 | ZnEDTA | 2.7 | 31 |
| P-2 | urea | 2.0 | phosphoric acid | 6.0 | K-acetate + KOH | 16.0 | — | 0 | 30 |
| Q-2 | urea + NH$_4$OH + (NH$_4$)$_2$S$_2$O$_3$ | 4.0 | phosphoric acid | 13.0 | K-acetate + KOH | 17.0 | (NH$_4$)$_2$S$_2$O$_3$ | 1.0 | 38 |
| R-2 | — | 0 | — | 0 | K-acetate + K$_2$S$_2$O$_3$ | 19.0 | K$_2$S$_2$O$_3$ | 6.0 | 38 |
| S-2 | NH$_4$OH + urea-triazone | 2.0 | — | 0 | K-acetate + KOH + K$_2$S$_2$O$_3$ | 20.0 | K$_2$S$_2$O$_3$<br>BNa$_3$O$_3$<br>CaEDTA<br>ZnEDTA | 8.0<br>0.2<br>0.1<br>0.45 | 37 |
| T-2 | NH$_4$OH | 2.0 | — | 0 | K-formate | 20.0 | FeEDDHSA<br>CoEDTA<br>MgEDTA | 6.3<br>1.8<br>0.9 | |
| U-2 | — | 0 | — | 0 | K-acetate | 24.0 | — | 0 | 42 |
| PrArt A | urea + NH$_4$OH | 6.0 | phosphoric acid | 20.0 | KOH | 5.0 | — | — | 45 |
| PrArt B | — | 0 | — | 0 | KOH + K$_2$S$_2$O$_3$ | 29 | — | 0 | 53 |
| PrArt C | urea + NH$_4$OH | 9.0 | superphosphoric acid | 24.0 | K-polyphosphate | 3.0 | FeSO$_4$ | 0.1 | 55 |
| PrArt D | urea | 10.0 | phosphoric acid + orthophosphate | 34.0 | — | — | — | — | 63 |

Urea-triazone refers to a urea triazone solution
K-{organic anion} refers to the potassium salt of the organic anion, e.g. K-succinate is potassium succinate
BNa$_3$O$_3$ is generically used in Table 1 to refer to all forms of Sodium Borate Without being bound by theory, and with no intention of limiting the scope of the claims, it is believed that the selection of particular salts as starting materials when subjected to the manufacturing conditions set forth herein results in an equilibrium "salt" blend that effectively stabilizes the aqueous fertilizer composition. For example, for a 10-18-4 fertilizer composition formulated from ammonium hydroxide, urea, phosphoric acid, potassium acetate, and potassium hydroxide, the resulting fertilizer composition equilibrium salt blend comprises about 8.6% monoammonium phosphate (MAP), about 18.5% diammonium phosphate (DAP), about 1.8% monopotassium phosphate (MKP), about 4.4% dipotassium phosphate (DKP), about 2.1% potassium acetate (KA), no tripotassium phosphate (TKP) and about 10.8% urea.

The low salt organic potassium source fertilizer (hereinafter referred to as "KOrg-fertilizer") is preferably used for fertilizing agricultural crops. The KOrg-fertilizer may be applied by a variety of methods, along with other fertilizers or pesticides or by itself, such as: as a starter or other fertilizer, as an in-furrow treatment, as a foliar fertilizer, as a side-dressed treatment after planting, or as a soil injected fertilizer, and for broadcast, soil-injection and fertigation applications. The KOrg-fertilizer may be used in no-tillage and minimal tillage conditions where it can be injected into the soil, surface dribbled in a band, sprayed between crop rows, or broadcast applied to meet the crops' nutrient requirements. The KOrg-fertilizer can be applied with herbicides and/or pesticides to reduce the number of trips over the field thus saving time, fuel and reducing soil compaction. Some recommended means of application, not intended to limit the scope of the claims, include in-furrow application, foliar application, side-dress treatment after planting, pre-planting soil injection, broadcast application, banding 2×2, fertigation, subsurface drip, drip tape, micro-jet, center pivot, surface drip, flood, sprinkler, and combinations thereof.

The low salt KOrg-fertilizer is beneficial for fertilizing all crops but is particularly useful in sandy soil conditions on crops that are salt sensitive. Non-limiting examples of crops which may be treated with the low salt KOrg-fertilizer of the invention include corn, soybeans, wheat, alfalfa, sugar beets, potatoes, grapes, onions, peppers, lettuce, beans, celery, cauliflower, broccoli, pumpkins, nectarines, tomatoes, other fruits and vegetables, and pulse crops. As is known in the art, the KOrg-fertilizer is applied at different rates or amounts depending upon the particular crop, the method of fertilization and the soil characteristics.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive.

As used herein, the specified terms are defined as follows: (1) "NPK" is an abbreviation for a composite fertilizer containing one or more sources of nitrogen (N), phosphorus (P in the form of $P_2O_5$) and/or potassium (K in the form of $K_2O$) at the wt % designated by the specific placeholder N—P—K; (2) "starter fertilizer" is a fertilizer applied in low doses close to the plant seed used to promote the growth of newly planted crops, particularly newly germinated seeds; (3) "banded fertilizer" is a fertilizer applied in low doses along the side of the seed row and either on the surface or below the seed row; (4) "in-furrow application" refers to the process of placing fertilizers directly with the seed during planting; (5) "top-dress" refers to broadcast applications on crops like small grains; (6) "side dress" refers to fertilizer placed at relatively high amounts anywhere from three to four inches from the row to half way between the crop rows; (7) "foliar application" refers to the process of applying liquid fertilizer directly to the leaves of a plant; (8) "broadcast application" refers to a uniform distribution of material on the soil surface; and, (9) "fertigation" refers to the injection of fertilizer into an irrigation system.

As used herein, the term "salt index" is determined by measuring the electrical conductivity of a 1% by weight aqueous solution of sodium nitrate and measuring the electrical conductivity of a 1% by weight aqueous solution of the fertilizer composition. The sodium nitrate solution is assigned a salt index value of 100. The salt index of the fertilizer (X) is then determined from the equation:

$$\frac{EC \text{ of } NaNO_3}{100} = \frac{EC \text{ of Fertilizer}}{X}$$

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A fertilizer composition comprising water and a carboxylic acid salt of potassium selected from (1) $CH_3(CH_2)_x COOK$ wherein x=0-4, (2) $MOOC(CR^1R^2)_x COOK$ wherein $R^1$=—H or —OH or —COOM and $R^2$=—H or —OH or —COOM and x=0-4 and M=H or K, (3) $HO(CR^1R^2)_x COOK$ wherein $R^1$=—H or a C1 to C4 alkyl group and $R^2$=—H or a C1 to C4 alkyl group and x=1-5, (4) $CH_3CO(CR^1R^2)_x COOK$ wherein $R^1$=—H or a C1 to C4 alkyl group and $R^2$=—H or a C1 to C4 alkyl group and x=1-3, or (5) combinations thereof, and optionally, a second potassium source selected from the group consisting of potassium phosphate, potassium hydroxide, potassium chloride, potassium thiosulfate, potassium silicate and combinations thereof, wherein the organic potassium source combined with the optional second potassium source delivers from 1% to 40% available potassium in the form of $K_2O$ in the fertilizer composition and wherein the fertilizer composition has a Storage Stability Value defined by the equation:

$$\frac{(|\% K \text{ in composition} - \% P \text{ in composition}|) \times (pH \text{ value})}{([K_2O \text{ derived from KOH}]/[K_2O \text{ derived from } KO_2R])}$$

and wherein (a) the Storage Stability Value of the fertilizer composition is less than 75 and the fertilizer composition has a pH between 5.5 and 7.7 or (b) the Storage Stability Value of the fertilizer composition is greater than 100 and the fertilizer composition has a pH between 6.0 and 9.5.

2. The fertilizer composition of claim 1 wherein the carboxylic acid salt of potassium is selected from the group consisting of potassium acetate, potassium propionate, potassium butyrate, potassium valerate, potassium hexanoate, potassium oxalate, potassium malonate, potassium succinate, potassium glutarate, potassium adipate, potassium lactate, potassium malate, potassium citrate, potassium glycolate, potassium tartrate, potassium glyoxylate, potassium pyruvate, and combinations thereof.

3. The fertilizer composition of claim 2 wherein the carboxylic acid salt of potassium is selected from the group consisting of potassium acetate, potassium propionate, potassium lactate, potassium malate, potassium citrate, potassium tartrate, potassium pyruvate, and combinations thereof.

4. The fertilizer composition of claim 1 wherein the organic potassium source combined with the optional second potassium source delivers from 3% to 25% available potassium in the form of $K_2O$ in the fertilizer composition.

5. The fertilizer composition of claim 1 wherein the fertilizer composition has a ratio of [$K_2O$ derived from KOH]/[$K_2O$ derived from $KO_2R$] between 0.0 and 3.3.

6. The fertilizer composition of claim 5 wherein the fertilizer composition has a ratio of [$K_2O$ derived from KOH]/[$K_2O$ derived from $KO_2R$] between 0.7 and 1.5.

7. The fertilizer composition of claim 5 wherein the fertilizer composition has a ratio of [$K_2O$ derived from KOH]/[$K_2O$ derived from $KO_2R$] between 1.5 and 3.3.

8. The fertilizer composition of claim 1 wherein the Storage Stability Value of the fertilizer composition is less than 60 and the fertilizer composition has a pH between about 5.7 to about 6.7.

9. The fertilizer composition of claim 1 wherein the Storage Stability Value of the fertilizer composition is greater than 100 and the fertilizer composition has a pH between about 6.0 to about 8.0.

10. The fertilizer composition of claim 1 further comprising a nitrogen source selected from the group consisting of urea, nitrate, triazone urea, urea triazone solution, ammonia, ammonium salts, ammonium hydroxide, amino acids, fish meal or extract, compost extract, kelp extract, shrimp extract, shellfish extract, and combinations thereof.

11. The fertilizer composition of claim 1 further comprising a phosphate source selected from the group consisting of rock phosphate, sodium phosphate, potassium phosphate, phosphoric acid, bone meal, monopotassium phosphate, dipotassium phosphate, tetrapotassium pyrophosphate, ammonium phosphate, ammonium polyphosphate, calcium phosphate, and combinations thereof, and wherein the phosphate source includes at least one source of orthophosphate.

12. The fertilizer composition of claim 1 further comprising a secondary nutrient selected from the group consisting of sulfur, zinc, boron, calcium, manganese, iron, copper, cobalt, magnesium, molybdenum, poly-aspartic acid, amino polycarboxylic acid, an inoculant, and combinations thereof.

13. The fertilizer composition of claim 12 wherein the secondary nutrient is derived from potassium thiosulfate, ammonium thiosulfate, zinc ethylenediaminetetraacetic acid (ZnEDTA), calcium ethylene-diaminetetraacetic acid (CaEDTA), ammonium calcium nitrate, manganese ethylenediaminetetraacetic acid (MnEDTA), iron ethylenediaminetetraacetic acid (FeEDTA), iron N-(hydroxyethyl) ethylene-diaminetriacetic acid (FeHEDTA), iron ethylene-diamine-N, $N^1$-bis (2-hydroxyphenylacetic acid) (FeEDDHA), iron ethylene-diamine-di (2-hydroxy-5-sulfophenylacetic acid) (FeEDDHSA), cobalt ethylenediaminetetraacetic acid (CoEDTA), cobalt sulfate, magnesium ethylenediaminetetraacetic acid (MgEDTA), ethylene-diaminetetraacetic acid (CuEDTA), sodium borate, disodium octaborate tetrahydrate, boric acid, ammonium molybdate, sodium molybdate or a combination thereof.

14. The fertilizer composition of claim 1 further comprising poly-aspartic acid, amino polycarboxylic acid, or an inoculant, or a combination thereof.

15. The fertilizer composition of claim 14 further comprising an inoculant selected from the group consisting of strains designated as *Bacillus subtilis, Bacillus methylotrophicus, Bacillus amyloliquefasciens, Bacillus megaterium* and *Bacillus licheniformis*, and combinations thereof.

* * * * *